2,520,725

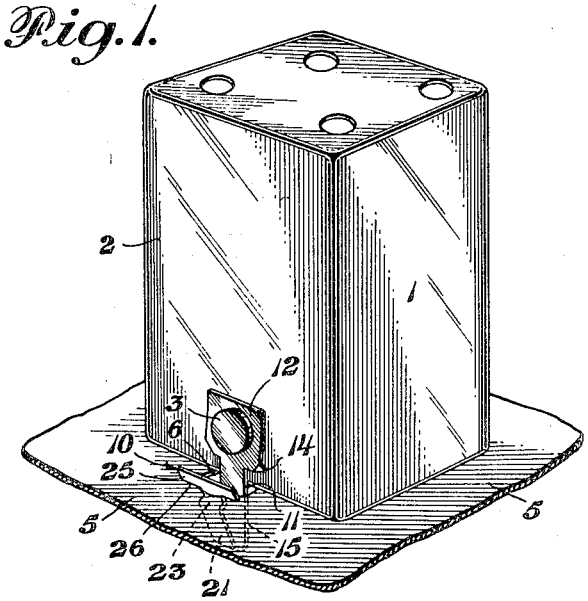
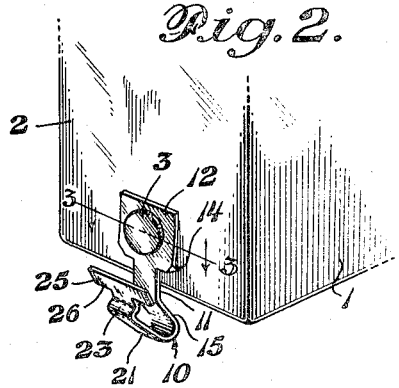
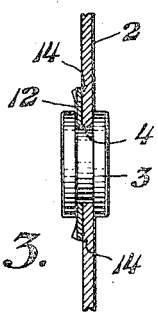
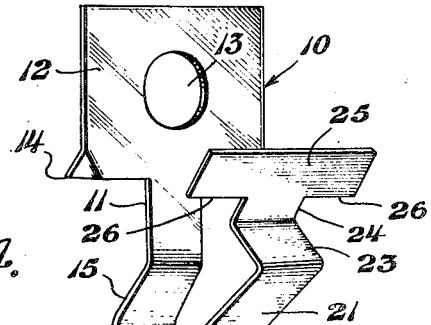
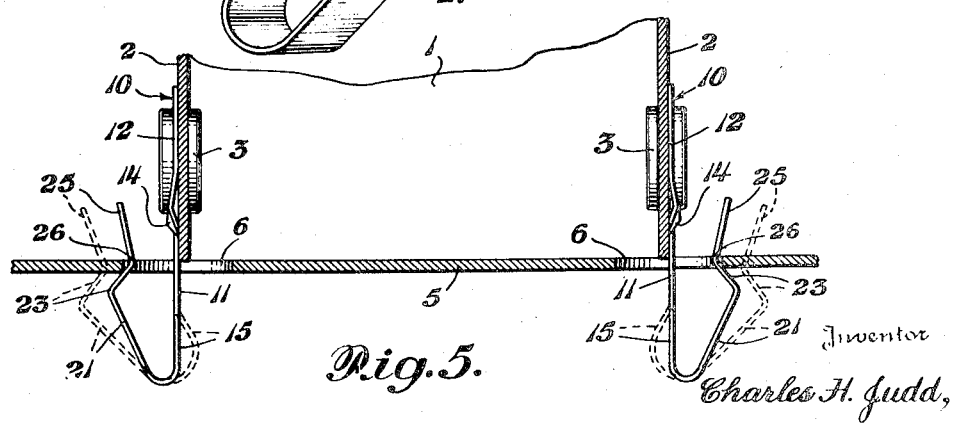
Aug. 29, 1950 — C. H. JUDD — 2,520,725
SUPPORT CONSTRUCTION AND FASTENING DEVICE THEREFOR
Filed Aug. 26, 1946
Inventor
Charles H. Judd,
By H. G. Lombard
Attorney Patented Aug. 29, 1950

UNITED STATES PATENT OFFICE 2,520,725

SUPPORT CONSTRUCTION AND FASTENING DEVICE THEREFOR

Charles H. Judd, Cleveland, Ohio, assignor to Tinnerman Products, Inc., Cleveland, Ohio, a corporation of Ohio Application August 26, 1946, Serial No. 692,998

6 Claims. (Cl. 248—361)

This invention relates in general to improvements in fastening installations for detachably mounting an object or part onto a supporting part, or otherwise releasably securing the parts of an assembly.

More particularly, this invention is directed to fastening installations for detachably mounting an electrical unit, such as a condenser shield on a radio chassis, or any other unit to be secured on a support, by means of an improved fastener which is designed for simple, speedy snap fastening application to secure the parts of the assembly rigidly and reliably, and yet, is capable of quick and easy release and removal to permit ready disassociation of the parts of the assembly for servicing or repair purposes.

A primary object of the invention is to provide such a fastening installation comprising an improved spring clip which provides a firm, rigid mounting of the parts of the assembly under continuously effective spring tension against loosening or displacement even under extreme conditions of vibration and shock. To this end, the fastener includes an attaching member provided with wings defining abutments insuring application of the clips to proper fastening position and otherwise rigidifying and seating the same in applied position to secure the parts of the assembly tightly against any movement that might tend toward loosening or displacement of such parts.

A further object is to provide a fastening installation and fasteners of this character in which the wing elements on the attaching portions of the clips are so designed that one may easily manipulate the same with his fingers to obtain a quick and easy release and removal of the fasteners from applied fastening position and thereby effect a ready separation of the parts secured, without the use of tools or other equipment.

Another object of the invention is for the provision of such a fastening installation and fastener in which the fastener includes an improved highly simplified arrangement for uniting the same fixedly to the part to be mounted and which requires only a single rivet and riveting operation making for considerable savings in labor and other costs of manufacture.

A further object of the invention is to provide such fasteners in the form of simple, one-piece sheet metal clip devices which are cheap and inexpensive to manufacture and lend themselves to economical quantity production in that they may be produced at relatively low cost from ordinary sheet metal strip stock with little loss or waste of material.

Further objects and advantages, and other new and useful features in the construction, arrangement and general combination of parts of the invention will be readily apparent to those skilled in the art as the description thereof proceeds with reference to the accompanying drawings, for purposes of illustration but not of limitation, in which like reference characters designate like parts throughout the same, and in which:

Fig. 1 is a perspective view showing, for example, a condenser shield installation secured by the improved fastener of the invention;

Fig. 2 is a fragmentary perspective view disclosing the arrangement for uniting the clip in fixed position on the condenser shield or other part to be mounted;

Fig. 3 is a sectional view along line 3—3 of Fig. 2 looking in the direction of the arrows;

Fig. 4 is an enlarged perspective view of the fastener per se; and

Fig. 5 is an enlarged, vertical sectional view through the lower portion of a condenser shield installation, such as illustrated in Fig. 1, showing a pair of the improved fasteners as united to opposite, spaced walls of the condenser shield and firmly and rigidly securing the shield in attached position on a supporting panel.

Referring now, more particularly, to the drawings, Figs. 1 and 5 illustrate an extensive application of the invention as employed for removably mounting a condenser shield 1 of the type commonly used in electrical apparatus onto a supporting panel 5, included in a radio chassis, for example. In general, the clip fasteners 10 are fixedly secured to opposing spaced walls of the condenser shield with the resilient shank portions thereof extending below the lower edge of the shield in position for snap fastening engagement in suitably spaced openings 6 in the panel. These openings 6 may be of circular, rectangular or other selected outline so long as they are of a size proportionate to the dimensions of the resilient shanks or attaching portions of the clips and are so spaced as to provide for a snap fastening engagement of the clip shanks in said openings, substantially as shown in Figs. 1 and 5.

The preferred form of clip fastener shown in Fig. 4 is particularly advantageous in that it is a simple, inexpensive device which may be constructed of any suitable sheet metal material, preferably spring metal or cold-rolled metal having spring like characteristics. The clip may be formed from blanks of various outlines, of course, but from a quantity production standpoint it is most advantageously provided from a comparatively small, generally rectangular blank which may be obtained from ordinary sheet metal strip stock with little loss or waste of material.

As best seen in Fig. 4, the clip preferably is formed from a blank having an intermediate strip portion which is return bent to provide a pair of spaced legs 11, 21, of unequal length defining the resilient shank of the clip. The longer or connecting leg 11 has at its end a base 12 in the form of a generally square or other suitable enlargement provided with a rivet receiving hole 13 and downturned corners defining prongs 14 along the lower edge thereof adjacent the leg 11. If desired, all four corners of the base 12 may be so formed and similar prongs may be provided by elements struck out from said base 12.

The portion of the leg 11 adjacent the base 12 lies substantially in the plane of said base but the lower portion 15 thereof is bent to extend in angular relation thereto when the clip is normally untensioned. The leg portion 15 and the other leg 21 define a generally U-shaped return bend in which the leg 21 is readily yieldable toward the leg 11 and in which the bent portion 15 of leg 11 is sufficiently flexible as to be biased from its initial angular relation, aforesaid, to a position in which it lies substantially in the general plane of said leg member 11, as illustrated in the full line showing of the clips in Fig. 5 which represents the fasteners in tensioned fastening position.

The shorter or attaching leg member 21 of the clip, Fig. 4, extends initially in generally parallel and spaced relation to the leg portion 15, and adjacent its upper end, is bent inwardly to define an inclined cam shoulder 23, and a relatively small neck portion 24 extending upwardly from said shoulder and carrying an enlarged head section 25 comprising lateral wings defining abutments 26 on the lower edges thereof.

The clip fasteners are united to opposing walls 2 of the condenser shield by rivets 3 securing the bases 12 of the fasteners to the shield in such a way that the resilient shanks of the fasteners extend free beyond the lower edge of the shield. While the fasteners may be attached in an equivalent manner by screws, welding or other means, the riveted construction shown is much more advantageous inasmuch as this step in manufacture is highly simplified and speedily effected merely by applying only a single rivet through the hole 13 in the fastener base and through a perforation 4 in the associated wall of the shield, whereupon the rivet is tightly peened against the fastener base 12 to cause the projecting corner prongs 14 thereon to dig into and become embedded in the underlying surface of the wall 2 of the condenser shield, substantially as shown in Figs. 3 and 5. The fastener is thus fixedly connected to the shield by the rivet 3 and prongs 14 such that it is not subject to shifting or displacement in any way which would cause a faulty or loose installation.

With the clip fastenrs 10 thus connected to opposing walls of the condenser shield, the shield 1 may be easily and quickly attached to the panel 5 by applying the resilient shanks of the fasteners to the panel openings 6 having a predetermined size and spacing corresponding to the position of engagement therein of the attaching legs 21 of the fasteners in compressed, tensioned relation. The panel openings 6 may be of any desired outline but usually are of circular configuration wherever possible, inasmuch as such punching tools are the most common, cheepest and easiest to operate.

As best seen in Fig. 5, the generally U-shaped clip shanks in initial, untensioned relation are angularly disposed relative to the respective walls 2 of the condenser shield, as represented in dotted lines. The bights of the U-shaped shank portions of the clips are inserted into the panel openings 6 and as the clips are advanced axially, the outer or shorter legs 21 of the clips, cam against the adjacent edges of the panel openings and are thereby compressed inwardly toward the complementary legs 11 as necessary to permit the cam shoulders 23 to snap into fastening engagement with the corner edges of the openings and marginal underside portions of the panel adjacent thereto.

The axial movement of the clip shanks within the panel openings is limited by the abutments 26 defined by the projecting wings of the head sections 25. These abutments extend beyond the dimensions of the panel opening and thereby engage the panel to limit the axial movement of the clip shank in the panel opening to the position in which it is properly seated therein in most effective fastening position. Preferably, in the applied fastening position of the clip, the abutments 26 bear upon the panel and cooperate with the cam shoulder 23, in engaging the opposite sides of the panel to retain the clip against axial movement in either direction so that the condenser shield or other object is held firmly and rigidly in attached position.

An important feature in the construction of the clips resides in the provision of the bent portion 15 on the connecting leg, which as represented in dotted lines in Fig. 5, is in angular relation to the general plane of leg 11 when normally untensioned, but, as the attaching leg 21 is compressed on being advanced to fastening position, as aforesaid, is caused to flex into the general plane of leg 11 in the fully applied fastening of the clip, as seen in full lines in Fig. 5. Inasmuch as the biased leg portion 15 attempts to assume its initial bent configuration at all times, a constant spring force is stored in the area of said leg portion 15 and this constant spring force is transmitted to the shorter attaching leg 21 to exert a continuous outer pressure thereon which maintains the cam shoulder 23 in positive locked abutting relation at all times with the edge portion of the panel opening engaged thereby.

Removal of the clip fasteners and disassociation of the parts of the assembly may be easily and quickly effected simply by applying one's fingers to the head sections 26 of the clips and compressing the same inwardly as necessary to move the cam shoulders 23 out of fastening engagement with the edges of the panel openings to a position in which said shoulders may pass through the panel openings and be removed therefrom. The clip shanks thereupon are free to assume their initial untensioned configuration, represented by the dotted lines in Fig. 5, and accordingly, may be again applied to mount the condenser shield or other part in a repetition of the foregoing described procedure.

While the invention has been described in detail with a specific example such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a support construction comprising a supporting panel having a fastener receiving opening and an object supported on said panel having a wall positioned in generally normal relation to said panel adjacent said opening therein, a fastener comprising a strip of metal having a return bend providing a pair of spaced leg members of unequal length and defining a resilient shank receivable in said panel opening, the longer leg member including a portion adapted to be connected to said wall of the object supported on said panel and a portion extending outwardly out of the plane of said longer leg member when untensioned and adapted to be biased toward the plane thereof in the applied position of the fastener in said panel opening, the shorter leg member extending free and having a shoulder adapted to engage the adjacent edge of the panel opening under the spring force of said biased portion of the longer leg member.

2. In a support construction comprising a supporting panel having a fastener receiving opening and an object supported on said panel having a wall positioned in generally normal relation to said panel adjacent said opening therein, a fastener comprising a strip of metal having a return bend providing a pair of spaced leg members of unequal length and defining a resilient shank receivable in said panel opening, the longer leg member including a portion for securing said longer leg member to said wall of the object supported on said panel, the shorter leg member extending free and having a shoulder adapted to engage the adjacent edge of the panel opening and a head portion adjacent said shoulder comprising lateral abutments adapted to bear upon the panel adjoining said panel opening to seat the fastener in applied position in said opening, said head portion being of such size as to define finger engageable means for moving said shoulder out of fastening engagement with the panel in releasing the fastener from applied position in said panel opening.

3. In a support construction comprising a supporting panel having a fastener receiving opening and an object supported on said panel having a wall positioned in generally normal relation to said panel adjacent said opening therein, a fastener comprising a strip of metal having a return bend providing a pair of spaced leg members of unequal length and defining a resilient shank receivable in said panel opening, the longer leg member including a portion adapted to be connected to said wall of the object supported on said panel and a portion extending outwardly out of the plane of said longer leg member when untensioned and adapted to be biased toward the plane thereof in the applied position of the fastener in said panel opening, the shorter leg member extending free and having a shoulder adapted to engage the adjacent edge of the panel opening under the spring force of said biased portion of the longer leg member, and a lateral abutment adjacent said shoulder adapted to bear upon the panel adjoining the panel opening to seat the fastener in applied position in said panel opening.

4. In a support construction comprising a supporting panel having a fastener receiving opening and an object supported on said panel having a wall positioned in generally normal relation to said panel adjacent said opening therein, a fastener comprising a strip of metal having a return bend providing a pair of spaced leg members of unequal length and defining a resilient shank receivable in said panel opening, the longer leg member including a portion adapted to be connected to said wall of the object supported on said panel and a portion extending outwardly out of the plane of said longer leg member when untensioned and adapted to be biased toward the plane thereof in the applied position of the fastener in said panel opening, the shorter leg member extending free and having a shoulder adapted to engage the adjacent edge of the panel opening under the spring force of said biased portion of the longer leg member, and a head portion adjacent said shoulder comprising a lateral abutment adapted to bear upon the panel adjoining said panel opening to seat the fastener in applied position in said opening, said head portion being of such size as to define finger engageable means for moving said shoulder out of fastening engagement with the panel in releasing the fastener from applied position in said panel opening.

5. In a support construction comprising a supporting panel having a fastener receiving opening and an object supported on said panel having a wall positioned in generally normal relation to said panel adjacent said opening therein, a fastener comprising a strip of metal having a return bend providing a pair of spaced leg members of unequal length and defining a resilient shank receivable in said panel opening, the longer leg member including a portion having a projecting prong and a hole adapted to receive a rivet for securing said longer leg member to said wall of the object supported on said panel with said prong biting into said wall to anchor the fastener against shifting or displacement, the shorter leg member extending free and having a shoulder adapted to engage the adjacent edge of the panel opening and a head portion adjacent said shoulder comprising lateral abutments adapted to bear upon the panel adjoining said panel opening to seat the fastener in applied position in said opening, said head portion being of such size as to define finger engageable means for moving said shoulder out of fastening engagement with the panel in releasing the fastener from applied position in said panel opening.

6. In a support construction comprising a supporting panel having a fastener receiving opening and an object supported on said panel having a wall positioned in generally normal relation to said panel adjacent said opening therein, a fastener comprising a strip of metal having a return bend providing a pair of spaced leg members of unequal length and defining a resilient shank receivable in said panel opening, the longer leg member including a portion having a projecting prong and a hole adapted to receive a rivet for securing said longer leg member to said wall of the object supported on said panel with said prong biting into said wall to anchor the fastener against shifting or displacement, said longer leg member having a portion bent outwardly out of it plane when untensioned and adapted to be biased toward the plane thereof in the applied position of the fastener in said panel opening, the shorter leg member extending free and having a shoulder adapted to engage the adjacent edge of the panel opening under the spring force of said biased portion on the longer leg member, and a head portion adjacent said shoulder comprising lateral abutments adapted to bear upon the panel adjoining said panel opening to seat the fastener in applied position in said opening, said head portion being of such size as to define finger engageable means for moving said shoulder out of fastening engagement with the panel in releasing the fastener from applied position in said panel opening.

CHARLES H. JUDD.

REFERENCES CITED

The following references are of record in the file of this patent:

UNITED STATES PATENTS

| Number | Name | Date |
|---|---|---|
| 434,509 | Huntington | Aug. 19, 1890 |
| 570,669 | Lapworth | Nov. 3, 1896 |
| 1,771,757 | Keeper | July 29, 1930 |
| 2,002,302 | Strongson | May 21, 1935 |
| 2,144,910 | Churchill | Jan. 24, 1939 |
| 2,169,708 | O'Callaghan | Aug. 15, 1939 |
| 2,197,780 | Anthony | Apr. 23, 1940 |
| 2,358,491 | Del Camp | Sept. 19, 1944 |

FOREIGN PATENTS

| Number | Country | Date |
|---|---|---|
| 29,506 of 1909 | England | Nov. 17, 1910 |